US007546205B2

(12) United States Patent
Sumizawa et al.

(10) Patent No.: US 7,546,205 B2
(45) Date of Patent: Jun. 9, 2009

(54) ON-VEHICLE INFORMATION TERMINAL ROUTE CHARACTERISTICS EXTRACTION APPARATUS AND ROUTE CHARACTERISTICS DISPLAY METHOD

(75) Inventors: Akio Sumizawa, Zama (JP); Hiroshi Minagawa, Zama (JP); Wataru Oikubo, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 253 days.

(21) Appl. No.: 10/572,319

(22) PCT Filed: Sep. 15, 2004

(86) PCT No.: PCT/JP2004/013434

§ 371 (c)(1),
(2), (4) Date: Dec. 20, 2006

(87) PCT Pub. No.: WO2005/029002

PCT Pub. Date: Mar. 31, 2005

(65) Prior Publication Data
US 2007/0198172 A1    Aug. 23, 2007

(30) Foreign Application Priority Data
Sep. 18, 2003    (JP) .............................. 2003-325773

(51) Int. Cl.
*G01C 21/30* (2006.01)
(52) U.S. Cl. .................. 701/209; 701/210; 340/995.14; 340/995.19; 340/995.23; 340/995.27
(58) Field of Classification Search ......... 701/200–213; 340/990–995.24, 995.27
See application file for complete search history.

(56) References Cited

U.S. PATENT DOCUMENTS 5,220,507 A * 6/1993 Kirson ................... 701/202
5,473,324 A * 12/1995 Ueno .................... 340/990
5,787,383 A * 7/1998 Moroto et al. ............ 701/210

FOREIGN PATENT DOCUMENTS

JP   5-503369 A   6/1993
JP   6-249672 A   9/1994
JP   9-61179 A    3/1997

OTHER PUBLICATIONS

Standard Technologies Compiled by the Japanese Patent Office, "User Interfaces for Car Navigation Systems", primary classification 3-B-3 (one (1) page).
International Search Report dated Dec. 28, 2004 (one (1) page).

* cited by examiner

*Primary Examiner*—Richard M. Camby
(74) *Attorney, Agent, or Firm*—Crowell & Moring LLP

(57) ABSTRACT

An on-vehicle information terminal comprises a route search unit that searches for a plurality of routes connecting a current position to a destination and a characteristics extraction unit that extracts characteristics of each route searched by the route search unit based upon geographic names. The on-vehicle information terminal displays the characteristics of individual routes extracted by the characteristics extraction unit at a display device.

13 Claims, 9 Drawing Sheets

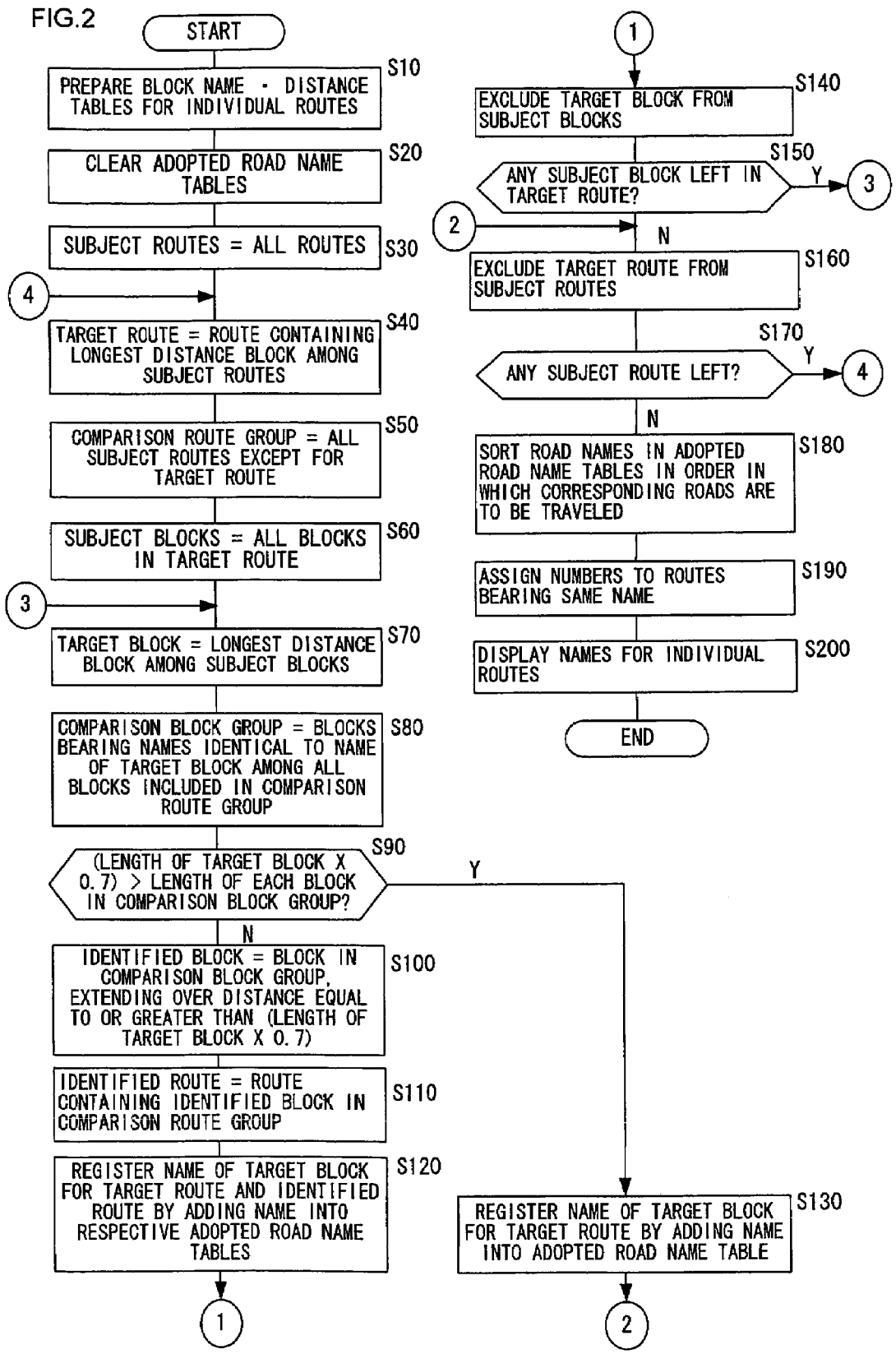

FIG.3

BLOCK NAME · DISTANCE TABLES

| ROUTE 1 | |
|---|---|
| NAME | DISTANCE |
| 20 ○○ STREET | 10 |
| 21 ×× STREET | 5 |
| 22 PREFECTURAL ROAD NO. 1 | 15 |
| 23 NATIONAL HIGHWAY NO. 111 | 20 |
| 24 EXPRESS HIGHWAY NO. 55 | 200 |
| 25 NATIONAL HIGHWAY NO. 222 | 50 |
| 26 PREFECTURAL ROAD NO. 10 | 10 |
| 27 □□ STREET | 5 |

(a)

| ROUTE 2 | |
|---|---|
| NAME | DISTANCE |
| 30 ○○ STREET | 20 |
| 31 NATIONAL HIGHWAY NO. 333 | 5 |
| 32 EXPRESS HIGHWAY NO. 66 | 100 |
| 33 EXPRESS HIGHWAY NO. 55 | 170 |
| 34 NATIONAL HIGHWAY NO. 222 | 5 |
| 35 PREFECTURAL ROAD NO. 10 | 2 |
| 36 □□ STREET | 2 |

(b)

| ROUTE 3 | |
|---|---|
| NAME | DISTANCE |
| 40 ○○ STREET | 15 |
| 41 ▲▲ STREET | 10 |
| 42 NATIONAL HIGHWAY NO. 555 | 100 |
| 43 NATIONAL HIGHWAY NO. 666 | 80 |
| 44 PREFECTURAL ROAD NO. 20 | 20 |
| 45 ■■ STREET | 10 |

DISTANCES ARE INDICATED IN UNITS OF Km (c)

FIG.4

ROUTE DATA FORMAT

| NUMBER OF ROUTES |
|---|
| ROUTE 1 |
| ⋮ |
| ROUTE m |

| NUMBER OF LINKS |
|---|
| LINK 1 INFORMATION |
| LINK 2 INFORMATION |
| ⋮ |
| LINK i INFORMATION |

COMPILED IN SEQUENCE, STARTING AT START POINT

| ROAD TYPE |
|---|
| DISTANCE |
| REQUIRED TRAVELING TIME |
| COORDINATES 1 |
| COORDINATES 2 |
| ⋮ |
| COORDINATES j |
| NUMBER OF CHARACTERS |
| NAME CODE 1 |
| ⋮ |
| NAME CODE k |

(a)     (b)     (c)

ADOPTED ROAD NAME TABLES

| ROUTE 1 |
|---|
| 60 ⎬ EXPRESS HIGHWAY NO. 55 |
| 61 ⎬ NATIONAL HIGHWAY NO. 222 |
| |
| |
| |

| ROUTE 2 |
|---|
| 62 ⎬ EXPRESS HIGHWAY NO. 55 |
| 63 ⎬ EXPRESS HIGHWAY NO. 66 |
| |
| |
| |

| ROUTE 3 |
|---|
| 64 ⎬ NATIONAL HIGHWAY NO. 555 |
| |
| |
| |
| |

(a)　　　　　　　　　　(b)　　　　　　　　　　(c)

ADOPTED GEOGRAPHICAL NAME TABLES

| ROUTE 1 | |
|---|---|
| 90 | YAMANASHI PREFECTURE |
| 91 | TOKYO |
| 92 | TACHIKAWA CITY |
| | |
| | |
| | |

| ROUTE 2 | |
|---|---|
| 93 | YAMANASHI PREFECTURE |
| 94 | TOKYO |
| 95 | MACHIDA CITY |
| | |
| | |
| | |

| ROUTE 3 | |
|---|---|
| 96 | SHIZUOKA PREFECTURE |
| | |
| | |
| | |
| | |
| | |

(a)  (b)  (c)

FIG.10
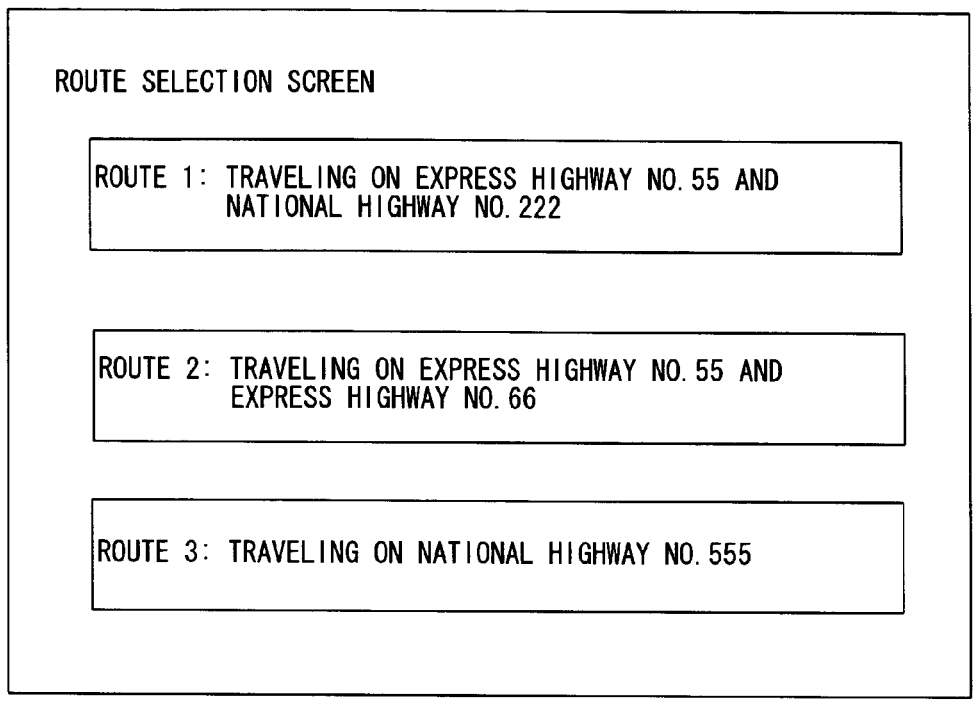
(a)
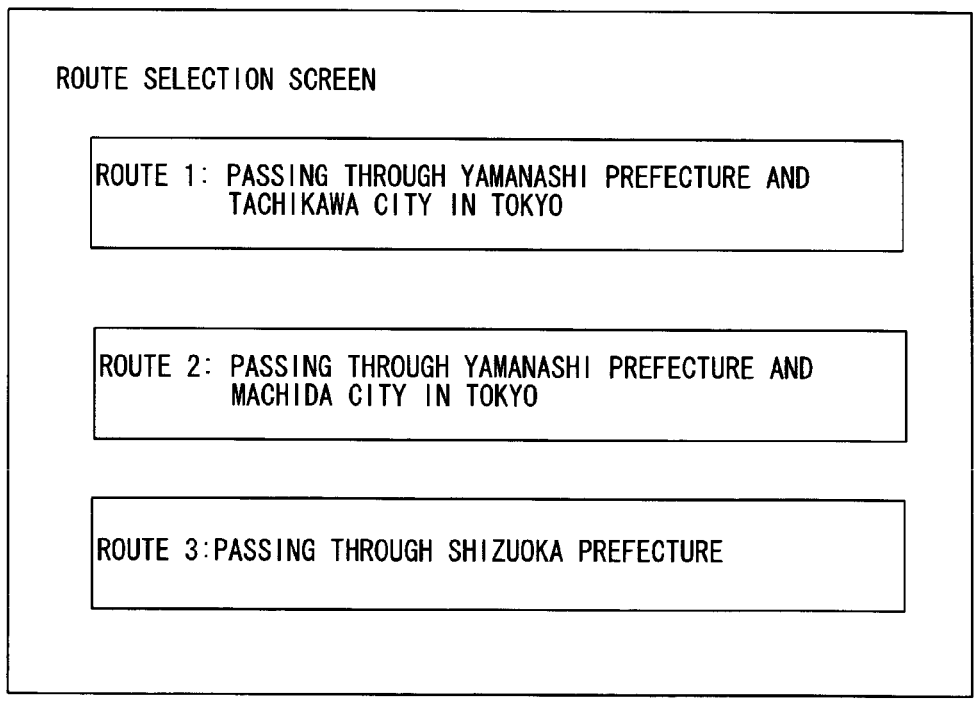
(b)

ON-VEHICLE INFORMATION TERMINAL ROUTE CHARACTERISTICS EXTRACTION APPARATUS AND ROUTE CHARACTERISTICS DISPLAY METHOD

TECHNICAL FIELD

The present invention relates to a method and an apparatus to be adopted to search for a recommended route from a start point to a destination and display the recommended route on the map.

BACKGROUND ART

There is a navigation system known in the related art that executes a route search for a route from a start point to a destination and enables the user to select a desirable route if a plurality of recommended routes are indicated as search results by displaying detailed information related to the length of traveling time, the traveling distance, the number of left/right turns and the like for each route simultaneously (patent reference literature 1). There is also a navigation system capable of displaying the individual recommended routes on the map in addition to the detailed information regarding the recommended route (non-patent reference literature 1).

patent reference literature 1: Japanese Laid Open Patent Publication No. H6-249672 non-patent reference literature 1: Standard Technologies compiled by the Japanese Patent Office "User Interfaces for Car Navigation Systems" primary classification 3-B-3

DISCLOSURE OF THE INVENTION

Problems to be Solved by the Invention

The navigation system disclosed in the patent reference literature 1 does not allow the user to verify the positions of the individual recommended routes on the map. In addition, recommended routes located close to each other, for instance, may overlap and be indistinguishable from each other on the map displayed by the navigation system disclosed in the non-patent reference literature 1. For these reasons, it is difficult to ascertain the geographic characteristics of each recommended route.

Means for Solving the Problems

The on-vehicle information terminal according to the present invention comprises a route search unit that searches for a plurality of routes connecting a current position to a destination and a characteristics extraction unit that extracts characteristics of each route searched by the route search unit based upon geographic names, displays at a display device the characteristics of individual routes extracted by the characteristics extraction unit.

It is desirable that the characteristics extraction unit at the on-vehicle information terminal extract characteristics of each route based upon the road names of roads included in the route.

In addition, it is desirable that the characteristics extraction unit at the on-vehicle information terminal extract for each route the road name of a road extending over the longest distance among the roads included in the route as part of the characteristics of the route.

Furthermore, it is desirable that the characteristics extraction unit at the on-vehicle information terminal prepare for each route a block name-distance table, constituted with a table of the road names of the roads included in the route and distances over which individual blocks of the route each having the road name extend, based upon route data containing link information of the route and that the characteristics extraction unit identify the road name of the block with the greatest distance included in the route based upon the block name-distance table thus prepared and extract the identified road name.

The characteristics extraction unit at the on-vehicle information terminal should preferably set a longest distance block among all the routes as a target block, set a route containing the target block as a target route, set routes other than the target route as a comparison route group, compare a first distance value obtained by multiplying the distance of the target block by a predetermined multiplicand with a distance (a second distance value) of a block (in the comparison block group) contained in the comparison route group and bearing a name identical to the name of the target block, extract the road name of the target block for the target route if the first distance value is greater than the second distance value, and extract the road name of the target block for the target route and a route (an identified route) containing the block in the comparison block group corresponding to the second distance value equal to or greater than the first distance value if the first distance value is not greater than the second distance value.

In addition, if the first distance value is greater than the second distance value, the characteristics extraction unit at the on-vehicle information terminal may set a longest distance block in the comparison block group as a new target block and set as a new target route a route containing the new target block, whereas if the first distance value is not greater than the second distance value, the characteristics extraction unit may set as a new target block a longest distance block among the blocks included in the target route excluding the target block.

The characteristics extraction unit at the on-vehicle information terminal may extract characteristics of each route based upon geographic names of geographic points present on the route.

It is desirable that the characteristics extraction unit at the on-vehicle information terminal described above set geographic points on each route to be compared with one another and extract geographic names corresponding to the geographic points geographically most distanced from one another as part of characteristics of each route.

In the on-vehicle information terminal, the characteristics extraction unit should preferably set points corresponding to individual positions breaking up each of the routes into a predetermined number of equal segments as route breakup points, calculate sums each representing a total of linear distances between route breakup points at corresponding positions in the individual routes among the route breakup points having been set, a set of route breakup points with the largest sum as maximum distance route breakup points and extract geographical names of geographical points at which the maximum distance route breakup points are present.

Furthermore, it is desirable that the characteristics extraction unit at the on-vehicle information terminal set names of highest-order units of administrative districts among the geographical names corresponding to the geographic points at which the maximum distance route breakup points are present as target geographic names of the individual routes and extract the target geographical names having been set for the individual routes.

The characteristics extraction unit at the own vehicle information terminal described above should preferably make a decision as to whether or not one of the target geographical names having been set for each route is different from the rest. Then, if it is decided that there is a route with a target geographical name that does not match up of the routes, the characteristics extraction unit should set as new maximum distance route breakup points a set of route breakup points with the greatest sum of linear distances between the route breakup points at corresponding positions set for the routes excluding the route with the different target geographical name and set names of the highest-order units of administrative districts among geographical names corresponding to geographical points at which the new maximum distance route breakup points thus set are present as new target geographical names for the routes having the newly set maximum distance route breakup points. If, on the other hand, there is no route with a target geographical name that does not match up, the characteristics extraction unit should set names of next highest-order units of administrative districts after the administrative districts corresponding to the current target geographical names as new target geographical names for each routes.

If there is no route with a target geographical name that does not match up and the matching target geographical names indicate a name of a lowest-order unit of administrative district, the characteristics extraction unit at the own vehicle information terminal may set as new maximum distance route breakup points a set of route breakup points with a largest sum of linear distances between the route breakup points at corresponding positions in the individual routes among the remaining route breakup points excluding the current maximum distance route breakup points.

It is desirable that if identical characteristics are extracted in correspondence to a plurality of routes, the characteristics extraction unit at the on-vehicle information terminal sequentially assign numbers to be used to identify the individual routes.

The route characteristics extraction apparatus achieved in another mode of the present invention comprises a route search unit that searches for a plurality of routes connecting a current point to a destination, a characteristics extraction unit that extracts characteristics of each route having been searched by the route search unit based upon geographical names and an output unit that provides an external recipient with a signal output indicating the characteristics of the individual routes having been extracted by the characteristics extraction unit.

In the route characteristics display method achieved in yet another mode of the present invention, a search for a plurality of routes connecting a current point to a destination is executed, characteristics of each route having been searched are extracted based upon geographical names and the characteristics of the individual routes having been extracted are displayed.

Effect Of The Invention

According to the present invention, characteristics of each route among a plurality of routes having been searched are extracted based upon geographical names and are displayed, which allows the user to ascertain the geographical characteristics of the individual routes with ease.

BRIEF DESCRIPTION OF THE DRAWINGS

FIG. 2 presents a flowchart of the processing executed to display characteristics of recommended routes by using the names of the roads on which the recommended routes are mainly traveling;

FIG. 3 presents an example of block name-distance tables;

FIG. 4 shows the format of the route data;

FIG. 10 presents examples of recommended route selection screens, with FIG. 10(a) presenting an example in which characteristics of the individual recommended routes are displayed by using the names of the roads on which the recommended routes are mainly traveling and FIG. 10(b) presenting an example in which characteristics of the individual recommended routes are displayed by using the geographical names of the geographical points through which the recommended routes are mainly traveling;

BEST MODE FOR CARRYING OUT THE INVENTION

First Embodiment

Figure 1:
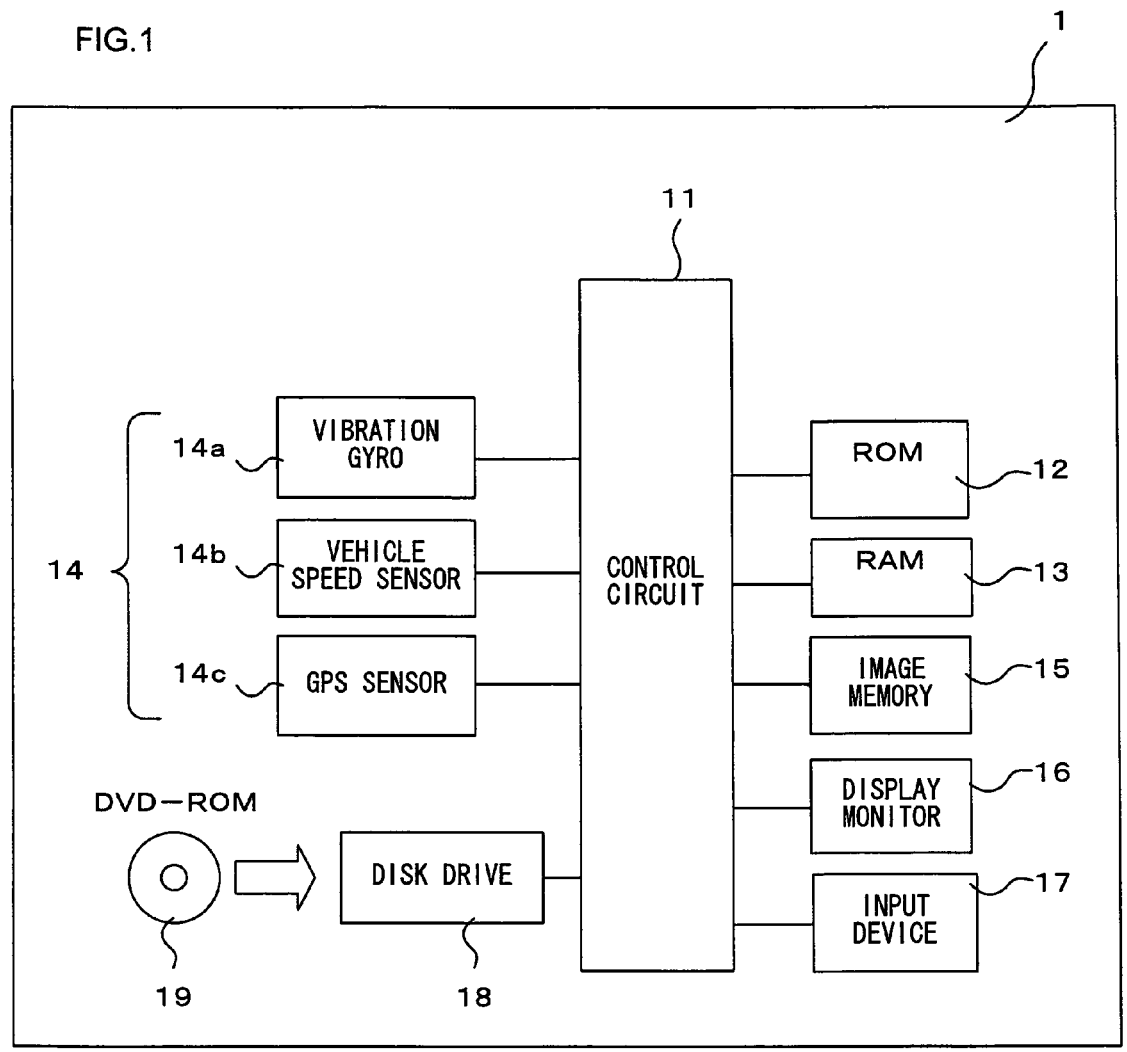
FIG. 1 is a block diagram of the structure adopted in the navigation system achieved in an embodiment of the present invention.

The structure of the navigation system achieved in an embodiment of the present invention is shown in FIG. 1. The navigation system, which is installed in a vehicle, searches for a route (recommended route) connecting a start point to a destination and displays the route on a map. In addition, if a plurality of recommended routes are indicated as the results of the search, it displays the names of the roads representing the individual recommended routes as their characteristics and allows the user to select a desirable recommended route. The navigation system 1 in FIG. 1 includes a control circuit 11, a ROM 12, a RAM 13, a current position detection device 14, an image memory 15, a display monitor 16, an input device 17 and a disk drive 18. A DVD-ROM 19 having recorded therein map data is loaded in the disk drive 18.

The control circuit 11, which is constituted with a microprocessor and its peripheral circuits, executes various types of processing and control by using the RAM 13 as its work area and executing in the work area a control program stored in the ROM 12. As the control circuit 11 executes a specific type of route search processing based upon the map data recorded in the DVD-ROM 19, the results of the processing are displayed as recommended routes at the display monitor 16.

The current position detection device 14 detects the current position of the subject vehicle and may be constituted with, for instance, a vibration gyro 14a that detects the advancing azimuth of the subject vehicle, a vehicle speed sensor 14b that detects the vehicle speed, a GPS sensor 14c that detects a GPS signal from a GPS satellite and the like. The navigation system 1 is capable of searching for a recommended route from a start point set at the current position of the subject vehicle which is detected by the current position detection device 14 to a destination having been set by the user.

In the image memory 15, image data of images to be displayed at the display monitor 16 are stored. The image data include road map drawing data and various types of graphic data to be used to display a map, which are generated by using the map data recorded in the DVD-ROM 19. At the display monitor 16, which operates under control implemented by the control circuit 11, various types of information such as maps is provided to the user as screen displays by using the image data stored in the image memory 15.

The input device 17 includes various types of input switches through which the user is able to set a destination and way points (hereafter simply and collectively referred to as a destination) and the like, and may be realized as an operation panel or a remote-control unit. Prompted by screen instructions displayed at the display monitor 16, the user operates the input device 17 to set a destination by specifying a geographical name or a position on the map.

The disk drive 18 reads out the map data from the DVD-ROM 19 loaded therein. It is to be noted that while an explanation is given on an example in which a DVD-ROM is used, the map data may instead be read out from a recording medium other than a DVD-ROM, such as a CD-ROM or a hard disk.

As the user sets a destination as described above, the navigation system 1 executes a route calculation to determine a route from a route search start point set at the current position detected by the current position detection device 14 to the destination based upon a specific algorithm. The recommended route thus determined is indicated on a map in such a manner that it can be easily distinguished from other roads by adopting a different display mode for the recommended route, e.g., by using a different display color. The user is thus able to recognize the recommended route on the map displayed on the screen. In addition, the navigation system provides the user with visual or audio instructions along the advancing direction to guide the subject vehicle along the recommended route.

It may be possible to set a plurality of different recommended routes connecting the current position and the destination through the route search executed as described above. In such a case, the user is allowed to select a desired recommended route among them and the subject vehicle is guided along the selected recommended route. In the embodiment, the road names of the main roads included in the individual recommended routes are displayed as characteristics of the recommended routes in a selection screen in which the user makes his selection so as to help the user ascertain the geographical characteristics of the recommended routes with ease. At this time, it is desirable to display the various recommended routes on the map, together with other information such as the total traveling distances, estimated arrival times at the destination and toll charges if any of the recommended routes includes a toll road.

FIG. 2 presents a flowchart of the processing described above. The processing in FIG. 2 is executed by the control circuit 11 when a plurality of recommended routes are indicated as the results of a route search. It is to be noted that the recommended routes may be simply referred to as routes in the following explanation. In step S10, a block name-distance table is prepared for each of the recommended routes having been searched. Each block name-distance table prepared in this step is a table of the names of the roads included in the recommended route and distances over which individual blocks each representing a segment of the recommended route corresponding to a specific road name (hereafter simply referred to as blocks) extend.

FIG. 3 presents an example of block name-distance tables. In this example, three recommended routes, route 1, route 2 and route 3, have been indicated through the search. In the block name-distance table for the route 1 in FIG. 3(*a*), the names of the roads and the distances over which they extend are listed as indicated in lines 20 through 27, sequentially in the order in which the vehicle is to travel along them starting from the current position (start point). Likewise, in the block name-distance table for the route 2 in FIG. 3(*b*), the names of the roads and the distances over which they extend are listed as indicated in lines 30 through 36, and the block name-distance table for the route 3 in FIG. 3(*c*), the names of the roads and the distances over which they extend are listed as indicated in lines 40 through 45. It is to be noted that if the subject recommended route includes a plurality of blocks bearing a single road name, these blocks may be handled as a single block or as separate blocks in the block name-distance table for the recommended route.

Block name-distance tables can be prepared based upon route data containing information of the individual recommended routes indicated through the route search. In the route data adopting a data format such as that shown in FIG. 4, information for each of the recommended routes, routes 1 through m, is recorded in sequence, as shown in FIG. 4(*a*). It is assumed that m routes have been indicated through the route search.

As the information on each of the recommended routes included in the route data, link information of links connecting the start point to the destination is recorded starting with the link at the start point, as shown in FIG. 4(*b*). The link information is information of roads over a specific road block (link) and each set of link information is constituted with the information shown in FIG. 4(*c*). The specific road block corresponding to a link is a block of the road divided by intersections, mesh boundaries in the map data or the like, and such a road block connects with another road or with an adjacent mesh. It is to be noted that FIG. 4(*b*) shows i links constituting the route 1 as an example. The other routes have structures similar to this.

As shown in FIG. 4(*c*), each set of link information includes information indicating the distance (the entire length) over which the link extends, the number of characters used to indicate the road name and name codes (character codes), in addition to information indicating the road type, the length of required traveling time, the coordinate positions of shape indicating points used to indicate the road shape along the link and the like. Accordingly, by listing the road names and the distances corresponding to the individual links included in each route based upon this information as a table, block name-distance tables such as those shown in FIG. 3 are created. It is to be noted that in the example presented in FIG. 4(*c*), a link 1 among the links present in the route 1 includes j shape indicating points and k name codes. The other links, too, have structures similar to this.

Figures 5, 6:
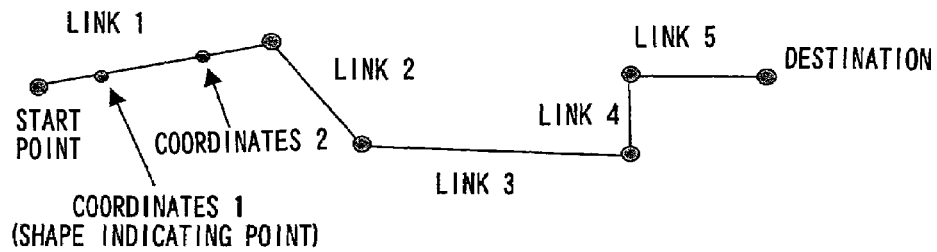
FIG. 5 shows a recommended route indicated by link information.
FIG. 6 presents an example of adopted geographical name tables.

Based upon the route data shown in FIG. 4, i.e., based upon the link information from the start point to the destination corresponding to each recommended route, the recommended route may be indicated as shown in FIG. 5, for instance. The road shape along each link is indicated based upon the coordinates of the shape indicating points contained in the link. It is to be noted that such route data can be obtained by determining the relevant links connecting the start point to the destination among the links in the entire area contained in the map data recorded in the DVD-ROM 19 and extracting the corresponding link information during the route search. During this process, the relevant links should be determined based upon conditions such as the distances and the lengths of required traveling time recorded in the link information.

In step S10 in FIG. 2, block name-distance tables such as those shown in FIG. 3 are prepared as described above. In step S20, adopted geographical name tables are cleared to set them in an initial state in which no road names are registered. In an adopted geographical name table, the names of main roads included in each recommended route, which have been extracted to be displayed as characteristics of the recommended route, are listed. Such adopted geographical name tables are obtained as a result of the processing in FIG. 2. By clearing the adopted geographical name tables in step S20, as described above, the results of the processing having been previously executed as shown in FIG. 2 are cleared and the results of the current processing can be newly entered in the adopted geographical name tables.

FIG. 6 presents examples of the adopted geographical name tables. FIGS. 6(a), 6(b) and 6(c) respectively show the adopted geographical name tables prepared in correspondence to the routes 1, 2 and 3 in FIG. 3. In the adopted geographical name table for the route 1 in FIG. 6(a), road names are registered as indicated in lines 60 and 61, and these road names are displayed on the screen as characteristics of the route 1. Likewise, road names are registered as indicated in lines 62 and 63 in the adopted geographical name table for the route 2 in FIG. 6(b), and a road name is registered as indicated in line 64 in the adopted geographical name table for the route 3 in FIG. 6(c). These registered road names are displayed as the characteristics of the corresponding routes. It is to be noted that the method adopted when preparing the adopted geographical name tables is to be explained later.

In step S20 in FIG. 2, the adopted geographical name tables described above are cleared for initialization. In step S30, all the routes indicated through the route search are set as subject routes in the subsequent processing (to be referred to as subject routes). In step S40, a single route that contains a block extending over a largest distance (a longest distance block) among the plurality of subject routes having been set is set as a target route. At this time, the block having been registered road name in the adopted geographical name tables is not included. In step S50, all other routes excluding the single target route having been set in step S40 among the plurality of subject routes are set as a comparison route group. It is to be noted that if there is only one subject route, the subject route is naturally set as the target route and, in such a case, no comparison route group is set in step S50.

In step S60, all the blocks included in the target route having been set in step S40 are set as subject blocks for the subsequent processing (to be referred to as subject blocks). However, any block bearing a road name having already been registered in the adopted geographical name table cannot be set as a subject block at this time. In step S70, the block with the largest distance among the subject blocks is set as a target block. In step S80, any block bearing a road name identical to the road name of the target block having been set in step S70 among all the blocks included in the comparison route group having been set in step S50 is set as a comparison block group. In step S80, a single block or a plurality of blocks may be set as a comparison block group, or no comparison block group may be set.

In step S90, a value (a first distance value) obtained by multiplying the distance over which the target block having been set in step S70 extends by a predetermined multiplicand, e.g., 0.7, is compared with a distance (a second distance value) corresponding to the comparison block group having been set in step S80 and a decision is made. If the comparison block group having been set includes a plurality of blocks, the comparison/decision-making is executed for each of the plurality of blocks. If it is decided that the former value (the first distance value) is greater than the latter value (the second distance value), the operation proceeds to step S130, whereas if the former value is not greater than the latter value, the operation proceeds to step S100. In step S100, a block included in the comparison block group having been set in step S80 with the second distance value thereof determined to be equal to or greater than the first distance value is set as an identified block. In step S110, the route in the comparison route group having been set in step S50, which includes the identified block having been set in step S100, is set as an identified route.

In step S120, the road name of the target block having been set in step S70 is registered for the target route having been set in step S40 and the identified route having been set in step S110 by adding the road name into the respective adopted geographical name tables. In step S130, on the other hand, the road name of the target block is registered for the target route having been set in step S40 alone by adding the road name into its adopted geographical name table. As a result, if the target block extends over a distance a predetermined ratio equal to or greater than any of the blocks included in the comparison block group, the target route is characterized by using the road name of the target block. If, on the other hand, the comparison block group includes a block extending over a distance that exceeds the predetermined ratio of the target block distance, the route containing this block as well as the target route is characterized by using the road name of the target block. After executing step S120, the operation proceeds to step S140, whereas the operation proceeds to step S160 after executing step S130.

In step S140, new subject blocks are set by excluding the target block having been set in step S70 from the current subject blocks having been set in step S60. As a result, the number of subject blocks included in the target route decreases. In step S150, a decision is made as to whether or not the target route still includes any subject block. If there is any subject block left in the target route, the operation returns to step S70 to set a new block as the target block and the subsequent processing is repeatedly executed. If, on the other hand, no more subject blocks are left in the target route, the operation proceeds to step S160.

In step S160, the current target route, i.e., the target route having undergone the processing in the immediately preceding step S130 or step S150, is excluded from the subject routes. Thus, this particular target route is never selected as a subject route for subsequent processing and, at this point in time, the registration contents in the adopted geographical name table for the target route are confirmed. In step S170, a decision is made as to whether or not there is any subject route yet to undergo the processing after the target route has been excluded in the immediately preceding step S160. If there is a subject route yet to undergo the processing, the operation returns to step S40 to set a new route as the target route and the subsequent processing is repeatedly executed. If, on the other hand, there is no more subject route yet to undergo the processing, the operation proceeds to step S180.

In step S180, the road names having been registered in the adopted geographical name table for each route through the processing steps executed so far are sorted in the order in which the corresponding roads are to be traveled on, starting from the start point and ending at the destination. As a result, the road names having been registered are displayed in the order in which the corresponding roads are to be traveled on.

If the road names having been sorted in step S180 indicate that there are routes with adopted geographical name tables having identical registration contents, i.e., if characteristics with identical contents have been extracted for a plurality of routes, numbers to be used to identify the individual routes are attached to the ends of the route names in step S190. Thus, even if a single road name is determined to request the characteristics of two or more routes, the routes can be identified as routes different from one another. In step S200, the road names in the adopted geographical name tables having been sorted in step S180 are displayed in the sorted order at the display monitor 16 in correspondence to the individual routes and, if necessary, the identification numbers having been assigned in step S190 are also brought up on display. The characteristics of the individual routes are thus brought up on display.

The following is an explanation of how the adopted geographical name tables in FIG. 6 are prepared based upon the block name-distance tables in FIG. 3 through the processing described above. First, in step S40 in FIG. 2, the route 1 containing the longest distance block among all the blocks, i.e., the block indicated in line 24 in FIG. 3(*a*) (Express Highway No. 55, extending over a distance of 200 km) is set as the target route. Then, in step S70, the block indicated in line 24 is set as the target block, and also, the block (Express Highway No. 55, extending over a distance of 170 km) contained in the route 2, which is indicated in line 33 in FIG. 3(*b*), is set as the comparison block group bearing the same road name as the target block in step S80.

Next, in step S90, the value obtained by multiplying the length of the target block, indicated in line 24, by a predetermined multiplicand (0.7 in this example), i.e., 200 km×0.7=140 km, is compared with the distance corresponding to the comparison block group, which is indicated in line 33, i.e., 170 km. Since 140 km <170 km, a negative decision is made in step S90, and the operation proceeds to step S100. In step S100, the block indicated in line 33 is set as the identified block, and then in step S110, the route 2 containing this block is set as the identified route. Next, in step S120, the road name of the target block indicated in line 24, i.e., "Express Highway No. 55" is registered in the adopted geographical name tables for both the route 1 which is the target route and the route 2, which is the identified route. Thus, the road name is registered as indicated in lines 60 and 62 in FIG. 6.

Subsequently, the block which has been designated as the target block, indicated in line 24 in FIG. 3, is excluded from the subject blocks in step S140, and then the operation returns to step S70 after an affirmative decision is made in the following step S150. In step S70 and subsequent steps, the next processing cycle is executed. During the next processing cycle, the longest distance block indicated in line 25 (National Highway No. 222, extending over a distance of 50 km) among the current subject blocks, i.e., among the blocks other than the block indicated in line 24 in the route 1 in FIG. 3(*a*) is set as the next target block. In step S80, the block (National Highway No. 222, extending over a distance of 5 km) bearing the same road name and contained in the route 2, which is indicated in line 34 in FIG. 3(*b*), is set as the next comparison block group.

Next, as in the previous processing cycle, the value obtained by multiplying the length of the target block indicated in line 25 by 0.7, i.e., 50 km×0.7=35 km, is compared with the distance representing the comparison block group, which is indicated in line 34, i.e., 5 km, in step S90. Since 35 km >5 km, an affirmative decision is made in step S90 in the current processing cycle, and thus the operation proceeds to step S130. In step S130, the road name of the block indicated in line 25, i.e., "National Highway No. 222" is registered for the target route 1 by adding the road name into the adopted geographical name table. As a result, the road name is registered as indicated in line 61 in FIG. 6.

Subsequently, the operation proceeds from step S130 to step S160 to exclude the route 1 having been processed as the target route from the subject routes. The registration contents of the adopted geographical name table for the route 1 are thus confirmed. An affirmative decision is made in the following step S170 and the operation returns to step S40. In step S40 and subsequent steps, the next processing cycle is executed. In the next processing cycle, processing similar to that explained above is repeatedly executed in step S40 and subsequent steps during which the road name indicated in line 63 in FIG. 6 is also registered for the route 2 and the registration contents of the adopted geographical name table for the route 2 are confirmed.

During the following processing cycle, the road name indicated in line 64 is registered for the route 3 and the registration contents of the adopted geographical name table for the route 3 are confirmed. The adopted geographical name tables shown in FIG. 6 are prepared based upon the block name-distance tables shown in FIG. 3 as explained above. The road names having been registered in the adopted geographical name tables thus prepared are individually displayed as shown in FIG. 10(*a*), for instance as the characteristics of the routes 1, 2 and 3.

During the processing described above, the block name-distance tables are prepared based upon the route data each in correspondence to one of the plurality of recommended routes having been searched out (step S10), all the recommended routes are set as subject routes (step S30) and the route containing the longest distance block is then set as the target route (step S40). Next, the value obtained by multiplying the distance over which the target block extends by a predetermined multiplicand is compared with the distance corresponding to the comparison block group bearing a road name identical to that of the target block (step S90). The road name of the target block is extracted only for the target route if the former value is determined to be larger, whereas the road name of the target block is extracted for both the target route and an identified route that includes the comparison block group if the former value is determined to be smaller, and then the extracted road name is registered into the corresponding adopted geographical name table(s) for the recommended route(s) (step S120, S130).

In addition, if the road name of the target block is registered in the adopted geographical name tables for the target route and the identified route, the target block is excluded from the subject blocks for the subsequent processing (step S140), and if the target route still includes any subject block yet to undergo the processing (step S150), a new target block is set (step S70). If, on the other hand, the target route does not have any more subject blocks or if the road name has been registered into the adopted geographical name table for the target route alone, the target route is excluded from the subject routes (step S160). Then, if there is any more subject route yet to undergo the processing (step S170), a new target route is set (step S40).

When the registration contents of the adopted geographical name tables for all the recommended routes are confirmed and there is no more subject route to be processed, the road names registered in each adopted geographical name table are sorted in the order in which the corresponding roads are to be traveled on (step S180) so as to indicate the characteristics of the corresponding recommended route. In addition, if contents of the adopted geographical name tables for a plurality of recommended routes are identical, numbers are assigned in sequence to distinguish the characteristics of the individual recommended routes from one another (step S190) and finally, the characteristics of the recommended routes are displayed (step S200).

The following advantages are achieved in the first embodiment described above.

(1) Characteristics of a plurality of routes having been searched are extracted and displayed based upon geographical names associated with the individual routes, i.e., the road names of the roads included in the individual routes. As a result, the user is able to ascertain the geographic characteristics of each route with ease.

(2) When extracting the characteristics of each route, the road name of the road extending over the greatest distance in the route is extracted as part of the characteristics of the route. More specifically, block name-distance tables are prepared each in correspondence to one of the routes based upon the route data indicating the links in the route, the road name of the longest distance block in the route is identified based upon the block name-distance table, and the identified road name is extracted. As a result, the characteristics of the route can be extracted based upon the road names and the lengths of the blocks included in the route.

(3) The first distance value obtained by multiplying the distance over which the target block extends by a predetermined multiplicand is compared with the second distance value corresponding to the comparison block group. If the first distance value is greater than the second distance value, the road name of the target block is extracted for the target route alone, whereas if the first distance value is not greater than the second distance value, the road name of the target block is extracted for both the target route and the identified route. Then, the extracted road name is registered into the corresponding adopted geographical name table(s). Thus, if the target block extends over a distance the predetermined ratio of which is equal to or greater than the distance of any of the blocks in the comparison block group, the road name of the target block can be used to characterize the target route. If, on the other hand, there is a block in the comparison block group that extends over a distance exceeding the predetermined ratio, the road name of the target block can also be used to characterize the route containing this block, as well as the target route.

(4) As a result of the comparison described in (3) above, if the first distance value is determined to be greater than the second distance value, the longest distance block in the comparison block group is set as a new target block, whereas if the first distance value is determined to be not greater than the second distance value, the longest distance block among the blocks contained in the target route excluding the current target block is set as a new target block. A new target block can thus be set so as to be able to register additional road names into the adopted geographical name tables.

(5) If the characteristics having been extracted for the individual routes include identical characteristics shared by a plurality of routes, identification numbers are assigned in sequence to distinguish the routes from one another. Consequently, even when a single road name is extracted as characteristics of two or more routes, it is possible to identify the routes as distinct from one another.

Second Embodiment

The navigation system achieved in another embodiment of the present invention is explained below. The navigation system achieved in the embodiment displays geographical names associated with a plurality of recommended routes and allows the user to select a desirable recommended route. The geographical names represent geographical areas through which the individual recommended routes pass. Namely, in this embodiment, geographical names instead of the road names used in the first embodiment are displayed to help the user ascertain the geographical characteristics of the individual recommended routes. It is to be noted that since the navigation system in the embodiment assumes a structure identical to that of the navigation system in the first embodiment shown in FIG. 1, its illustration and explanation are omitted.

Figure 7:
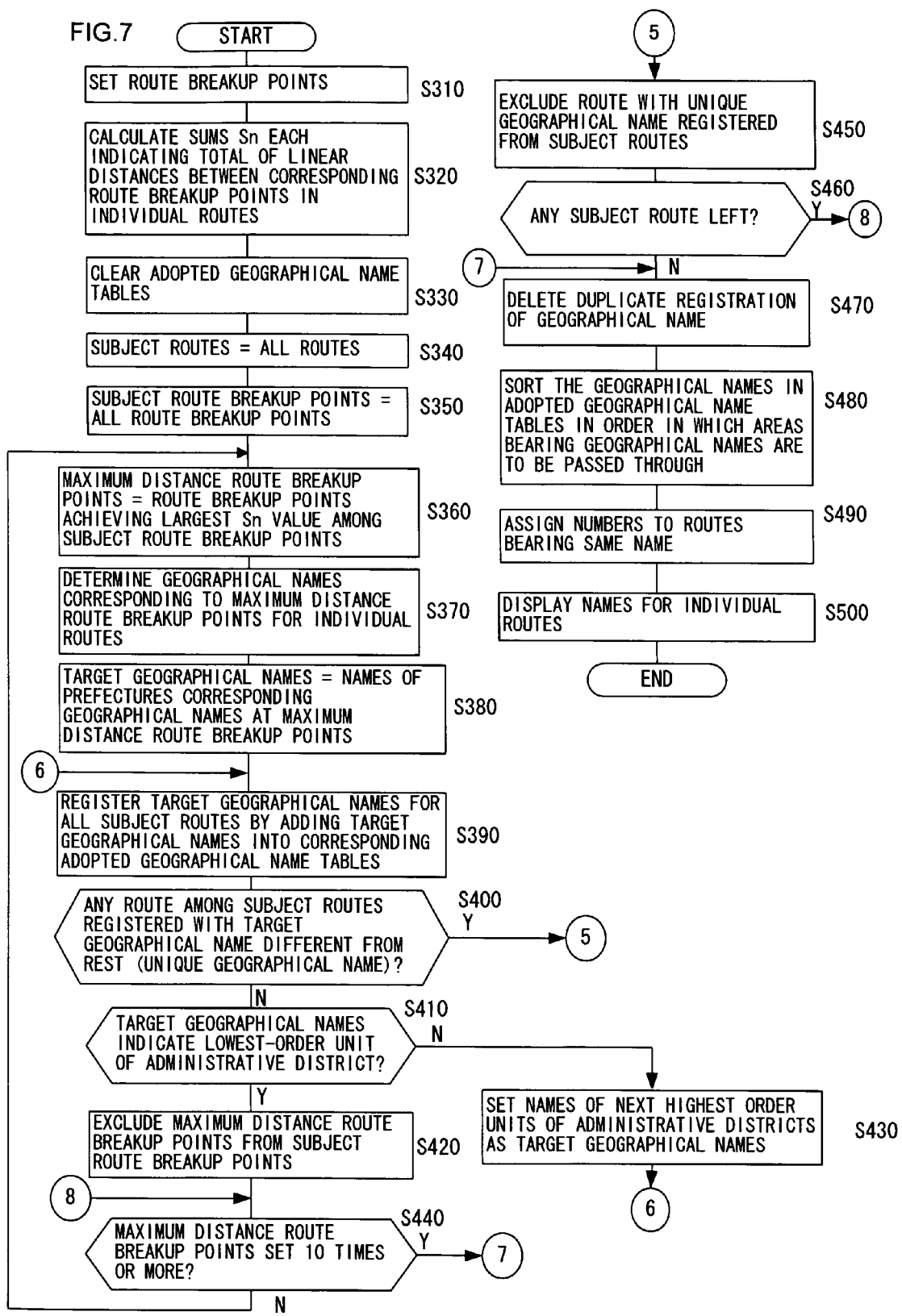
FIG. 7 presents a flowchart of the processing executed to display characteristics of recommended routes by using the geographical names of the geographical points through which the recommended routes are mainly traveling.

FIG. 7 presents a flowchart of the processing executed in the embodiment. It is to be noted that the processing in FIG. 7 is executed by the control circuit 11 when a plurality of recommended routes are indicated through a route search, as in the first embodiment. In step S310, positions at which each of the routes having been searched is broken into equal distance segments, e.g., into 50 equal segments, are determined and the points corresponding to the positions are set as route breakup points.

In the following explanation, the route breakup points set in step S310 are each indicated as P(m, n). m indicates the route number assigned to identify each route, whereas n indicates the sequential position number of a specific route breakup point assigned in such a manner that the lowest number indicates the route breakup point closest to the start point. For instance, if three recommended routes are indicated through the route search and each recommended route is broken into 50 equal segments with the route breakup points set accordingly, each of the route breakup point is indicated as P(m, n) through a specific combination of m that takes one of the values 1 through 3 and n that takes one of the values 1 through 49.

In step S320, the sum (indicated as Sn) of the linear distances between the route breakup points in each set of route breakup points present at corresponding positions in the individual routes among the route breakup points having been set in step S310 is calculated. Namely, Sn expressed as in (1) below is calculated in correspondence to each value assumed by n.

(Equation 1)

$$S_n = \sum_{m_1 < m_2} \overline{[P(m_1, n) P(m_2, n)]} \qquad (1)$$

m1 and m2 in expression (1) above represent a combination of values taken by m, which satisfy the relationship expressed as m1<m2 among sets of values each constituted with two arbitrary values different from each other extracted from all the values that may be assumed by m. Namely, when m=1~3, allowable combinations of m1 and m2 that can be used in the calculation expressed in (1) are (m1, m2)=(1, 2), (1, 3) and (2, 3). As a result, the sum of the distance between P(1, n) and P(2, n), the distance between P(1, n) and P(3, n) and the distance between P(2, n) and P(3, n) is calculated as indicated in expression (1). In other words, the value representing the total of all the distances extending between two route breakup points achieving a combination different from any other combinations is calculated by using expression (1). In step S320, such a sum Sn is calculated for all the values taken by n.

Figures 8, 9:
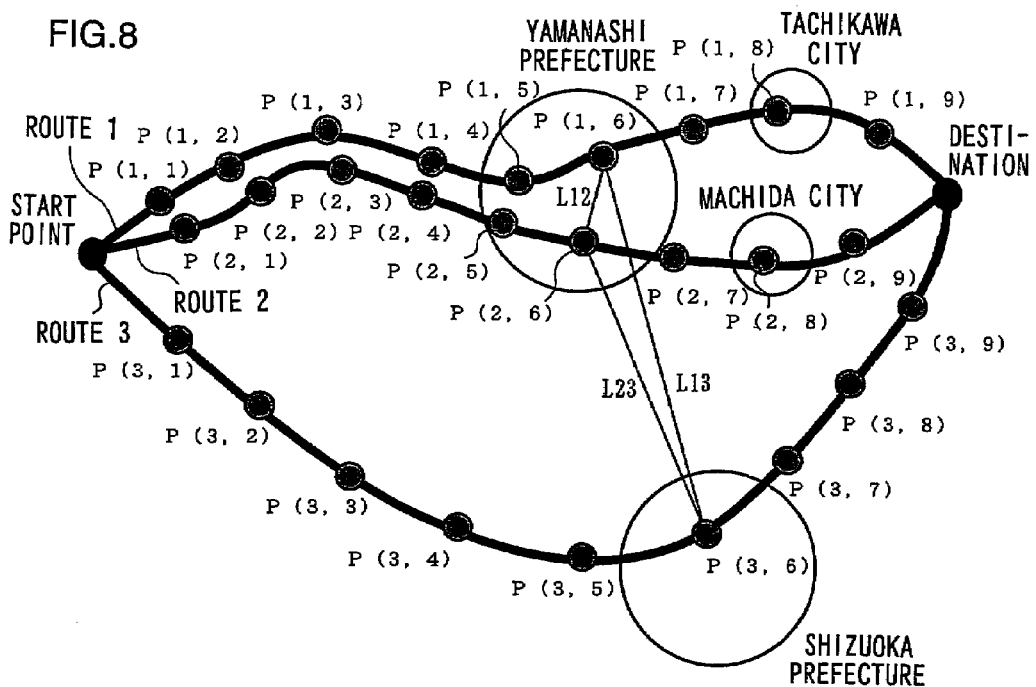
FIG. 8 presents an example of a sum Sn of linear distances between route breakup points in the individual routes.
FIG. 9 presents an example of adopted geographical name tables.

FIG. 8 presents an example of route breakup points set in step S310 and Sn calculated in step S320. When three recommended routes (routes 1, 2 and 3) have been indicated through the search, as shown in the figure, route breakup points breaking each route into a predetermined number of equal segments (10 equal segments in this example to simplify the illustration) are set in step S310. Through this step, route breakup points P(1, 1) through P(3, 9) are set as shown in the figure. In step S320, the values of Sn are calculated for these route breakup points within the range of n=1~9. For instance, when n=6, the value of S6 is calculated as the sum of the distance L12 between P(1, 6) and P(2, 6), the distance L13 between P(1, 6) and P(3, 6) and the distance L23 between P(2, 6) and P(3, 6). The values of S1 through S9 are thus calculated.

In step S330, adopted geographical name tables are cleared to set them in an initial state in which no geographical names are registered. In an adopted geographical name table, the names of the main geographical areas through which the corresponding recommended route passes, which have been extracted to be displayed as characteristics of the recommended route, are listed. Such adopted geographical name tables are obtained as a result of the processing in FIG. 7. FIG. 9 presents an example of adopted geographical name tables. FIGS. 9(a), 9(b) and 9(c) respectively show the adopted geographical name tables prepared in correspondence to the routes 1, 2 and 3 in FIG. 8.

In the adopted geographical name table for the route 1 in FIG. 9(a), geographical names are registered as indicated in lines 90, 91 and 92. Likewise, adopted geographical names are registered as indicated in lines 93, 94 and 95 in the adopted geographical name table for the route 2 in FIG. 9(b), and a geographical name is registered as indicated in line 96 in the adopted geographical name table for the route 3 in FIG. 9(c). The registered geographical names are displayed as the characteristics of the corresponding routes. It is to be noted that the method adopted when preparing the adopted geographical name tables is to be explained later.

In step S330 in FIG. 7, the adopted geographical name tables explained above are cleared for initialization. In step S340, all the routes having been indicated through the route search are set as subject routes, as in step S30 in FIG. 2. In step S350, all the route breakup points in the subject route having been set in step S340 are set as subject route breakup points.

In step S360, the set of the route breakup points achieving the largest value for Sn among the subject route breakup points is set as maximum distance route breakup points. Namely, with nmax representing the value of n at which Sn achieves the largest value, the maximum distance route breakup points among the route breakup points P (m, n) can be expressed as Pmax(m, nmax). It is to be noted that the number of the maximum distance route breakup points set in step S360 is indicated by the value of m in Pmax (m, nmax) representing the maximum distance route breakup points and this number of maximum distance route breakup points equals the number of subject routes set in step S340.

In step S370, geographical names corresponding to the maximum distance route breakup points having been set in step S360 are determined each in correspondence to one of the routes. Namely, the geographical names of the geographical points at which the individual maximum distance route breakup points having been set in the individual routes in step S360 are present, are determined. In step S380, the names of the highest-order units of administrative districts (excluding the name of the country), i.e., the names of the prefectures constituting part of the geographical names having been ascertained in step S370 are set as target geographical names. The number of target geographical names set in this step matches the number of current subject routes. In step S390, the target geographical names having been set in step S380 or the target geographical names having been set in step S430, as will be explained later, are registered in the adopted geographical name tables for the corresponding subject routes.

In step S400, a decision is made as to whether or not there is a single target geographical name that does not match up among the target geographical names having been registered into the adopted geographical name table for the subject routes in step S390. In the following explanation, such a target geographical name that is different from the rest is referred to as a "unique geographical name". The operation proceeds to step S450 if there is a route with a unique geographical name having been registered in the adopted geographical name table thereof, whereas the operation proceeds to step S410 if there is no such route.

In step S410, a decision is made as to whether or not the matching target geographical names indicate the name of the lowest-order unit of administrative district. For instance, when geographical names include the names of communities and neighborhoods, the names of such communities and neighborhoods constitute the names of the lowest-order units of administrative districts. It is to be noted that the street numbers and the house numbers following the names of the communities and neighborhoods are not considered in the decision-making executed in step S410. If the target geographical names all indicate the name of the lowest-order unit of administrative district, the operation proceeds to step S420, but the operation proceeds to step S430 otherwise.

In step S420, the maximum distance route breakup points having been set in step S360 are excluded from the subject route breakup points having been set in step S350. Subsequently, a decision is made in step S440 as to whether or not the maximum distance route breakup points have been set in step S360 over a predetermined number of times or more, and the operation returns to step S360 if it is decided that they have not been set for the predetermined number of times or more. In this case, a new set of maximum distance route breakup points is set and the subsequent processing is executed again. If, on the other hand, it is decided in step S440 that maximum distance route breakup points have already been set for the predetermined number of times or more, the operation proceeds to step S470. By selecting a value smaller than the number of the route breakup points having been set for this predetermined number of times, it is ensured that the processing is not repeated redundantly to result in route names that are too long. It is to be noted that while the predetermined number of times is set to 10 in FIG. 7, only nine route breakup points are set for each route in the example presented in FIG. 8 and, in such a case, an affirmative decision is never made in step S440. If only a small number of route breakup points is set, as in this case, the processing in step S440 may be omitted.

In step S430, the names of the next highest-order units of administrative districts after the current target geographical names are set as new target geographical names. For instance, if the current target geographical names all indicate the name of a prefecture, the names of municipalities, the names of boroughs or the like following the name of the prefecture are set as new target geographical names. Upon executing step S430, the operation returns to step S390 to execute the subsequent processing by using the new target geographical names having thus been set.

In step S450, the route for which the unique geographical name has been registered in step S390 is excluded from the current subject routes. As a result, the particular route becomes excluded from the subsequent processing and the registration contents of the adopted geographical name table for the route are confirmed at this point. Immediately after the route is excluded in step S450, a decision is made in the following step S460 as to whether or not there is still a subject route that requires further processing. If it is decided that there is still a subject route, the operation returns to step S440, whereas the operation proceeds to step S470 if all the routes are now non-subject routes.

If a single geographical name has been registered a plurality of times in the adopted geographical name table for a given route through the processing executed so far, the duplicated registration of the target geographical name is deleted in step S470 so that the adopted geographical name table contains a single registration of a given geographical name. If a geographical name has been registered a plurality of times through repeated execution of step S390, the plurality of registrations are integrated into a single registration through this processing. It is to be noted that if there are no duplicate registrations of geographical names in the adopted geographical name tables, the processing in step S470 is not executed.

In steps S480 through S500, processing similar to that executed in steps S180 through S200 in FIG. 2 is executed. Namely, in step S480, the geographical names having been registered in the adopted geographical name table for each route through the processing steps executed so far are sorted in the order in which the corresponding areas are to be passed through, starting from the start point and ending at the destination. If the geographical names having been sorted in step S480 indicate that there are routes with adopted geographical name tables having identical registration contents, i.e., if characteristics with identical contents have been extracted for a plurality of routes, numbers to be used to identify the individual routes are attached to the ends of the route names in step S490. In step S500, the geographical names in the adopted geographical name tables having been sorted in step S480 are displayed in the sorted order at the display monitor 16 in correspondence to the individual routes and, if necessary, the identification numbers having been assigned in step S490 are also brought up on display. The characteristics of the individual routes are thus displayed.

The following is an explanation of how the adopted geographical name tables in FIG. 9 are prepared based upon the route breakup points set for the individual routes set as shown in FIG. 8. First, in step S310 in FIG. 7, the route breakup points P(1, 1) to P(3, 9) are set as shown in FIG. 8, and then the sums Sn, i.e., S1 to S9, each representing the sum of the linear distances between the corresponding route breakup points, are calculated in step S320. Assuming that S6 among all the sums Sn having been calculated achieves the largest value, the route breakup points P(1, 6), P(2, 6) and P(3, 6) corresponding to the sum S6 are set as the maximum distance route breakup points in step S360.

Next, in step S370, geographical names corresponding to the maximum distance route breakup points P(1, 6), P(2, 6) and P(3, 6) are ascertained. In this example, the route breakup points P(1, 6) and P(2, 6) are present in Yamanashi Prefecture and the route breakup point P(3, 6) is present in Shizuoka Prefecture, as shown in FIG. 8. Thus, "Yamanashi Prefecture" is set as the target geographical names for the routes 1 and 2 and "Shizuoka Prefecture" is set as the target geographical name for the route 3 in step S380. These target geographical names are registered into the respective adopted geographical name tables in step S390. Consequently, the geographical name "Yamanashi Prefecture" is registered into the adopted geographical name tables for the routes 1 and 2 as indicated in lines 90 and 93 in FIG. 9, whereas the geographical name "Shizuoka Prefecture" is registered into the adopted geographical name table for the route 3 as indicated in line 96.

Then, in step S400, the geographical name "Shizuoka Prefecture" having been registered for the route 3 is judged to be a unique geographical name and the route 3 is excluded from the subject routes in step S450. Subsequently, an affirmative decision is made in step S460 and a negative decision is made in step S440 before the operation returns to step S360. Thus, the subsequent processing cycle is executed for the routes 1 and 2.

During the subsequent processing cycle, new sums S1 through S9 each indicating the total of the linear distances between the corresponding route breakup points among the route breakup points in the routes 1 and 2, i.e., the route breakup points P(1, 1) to P(2, 9), are calculated. Assuming that S8 among the newly calculated sums Sn achieves the largest value, the route breakup points P(1, 8) and P(2, 8) corresponding to S8 are set as new maximum distance route breakup points in step S360. In step S370, geographical names corresponding to the maximum distance route breakup points P(1, 8) and P(2, 8) are ascertained. In this example, the route breakup point P(1, 8) is present in Tachikawa City in Tokyo, whereas the route breakup point P(2, 8) is located in Machida City in Tokyo. Accordingly, the prefecture name "Tokyo" is set as the target geographical name for both the routes 1 and 2 in step S380, and consequently, the geographical name "Tokyo" is registered in lines 91 and 94 in the adopted geographical name tables in FIG. 9 in step S390.

Subsequently, in step S400, it is decided that no unique geographical name has been registered, and the operation proceeds to step S410. In step S410, it is decided that the geographical name "Tokyo" having been registered as the target geographical names does not represent the lowest-order unit of administrative district and, accordingly, the operation proceeds to step S430. In step S430, the geographical names "Tachikawa City" and "Machida City" following "Tokyo" are set as the target geographical names for the routes 1 and 2 respectively. After this, the operation returns to step S390 to execute the next processing cycle.

During the next processing cycle, the target geographical names having been set in step S430 are added into the adopted geographical name tables for the routes 1 and 2 for registration in step S390. The geographical names "Tachikawa City" and "Machida City" are thus registered as indicated in lines 92 and 95 in FIG. 9. As described above, the adopted geographical name tables in FIG. 9 are prepared based upon the route breakup points set in the individual routes as shown in FIG. 8, and the geographical names having been registered in the adopted geographical name tables are displayed as characteristics of the routes 1, 2 and 3, as shown in FIG. 10(b), for instance.

During the processing explained above, route breakup points breaking up each of the plurality of recommended routes resulting from the search into a predetermined number of equal distance segments are set (step S310) and the sum Sn of the linear distances between the corresponding route breakup points is calculated for each set of route breakup points corresponding portions in the individual routes (step S320). Then, all the recommended routes are set as subject routes (step S340), the route breakup points achieving the greatest value among the sums Sn having been calculated are set as the maximum distance route breakup points (step S360), the names of prefectures which is the geographical names corresponding to the individual maximum distance route breakup points are set as target geographical names (step S380) and the target geographical names are extracted and registered into the adopted geographical name tables for the respective subject routes (step S390).

In addition, if for which a unique geographical name that does not match up has been registered for a route among the subject routes (step S400), the particular route becomes a non-subject route that will not be part of the subsequent processing (step S450). If there is any remaining subject route that requires further processing (step S460) and it is decided that the maximum distance route breakup points have not been set for a number of times equal to or greater than the predetermined value (step S440), new maximum distance route breakup points are set (step S360).

In addition, if no unique geographical name that is different from the rest is registered for any of the subject routes (step S400), a decision is made as to whether or not the target geographical names indicate the name of the lowest-order unit of an administrative district (step S410). If it is decided that the target geographical names do not indicate the lowest-order unit of administrative district, names indicating the next highest order units of administrative districts after the target geographical names are set as new target geographical names (step S430), whereas if it is decided that the current target geographical names indicate the lowest-order unit of administrative district, the corresponding maximum distance route breakup points are excluded from the subsequent processing (step S420).

When the complete adopted geographical name tables for all the recommended routes are prepared and there is no more subject route requiring further processing, the road names registered in each adopted geographical name table are sorted in the order in which the corresponding areas are to be passed through (step S480) so as to indicate the characteristics of the corresponding recommended route. In addition, if contents of the adopted geographical name tables for a plurality of recommended routes are identical, numbers are assigned in sequence to distinguish the characteristics of the individual recommended routes from one another (step S490), and finally, the characteristics of the recommended routes are displayed (step S500).

The following advantages are achieved in the second embodiment described above.

(1) Characteristics of a plurality of routes having been indicated through a search are extracted and displayed based upon geographical names of the individual routes, i.e., the geographical names of geographical areas through which the individual routes pass. As a result, the user is able to ascertain the geographic characteristics of each route with ease.

(2) Corresponding points to be compared with one another are set in the individual routes, and the geographical names associated with the routes at the corresponding points that are most distanced from one another geographically are extracted as part of the characteristics of the individual routes. More specifically, route breakup points are set so as to breakup each route into a predetermined number of equal segments, the sums each indicating the total of the linear distances between the route breakup points at corresponding positions in the individual routes among the route breakup points having been set are calculated, the set of route breakup points achieving the greatest value for the sum is set as the maximum distance route breakup points, and the geographical names of the geographical areas in which the maximum distance route breakup points are present are extracted. Thus, the characteristics of the individual routes can be extracted based upon the geographical names of the geographical areas through which the routes pass at the greatest distance from one another.

(3) The names indicating the highest-order units of administrative districts in the geographical names of the geographical areas in which the maximum distance route breakup points are present are set as the target geographical names for the individual routes, and such target geographical names are extracted as the characteristics of the routes by registering the target geographical names into the respective adopted geographical name tables. As a result, the administrative district names set as the target geographical names are extracted as the characteristics of the individual routes.

(4) A decision is made as to whether or not there is any route for which a unique geographical name has been set, and if there is such a route, new maximum distance route breakup points are set in correspondence to the routes other than the route for which the unique geographical name has been registered. In addition, the names of the highest-order units of administrative districts in the geographical names of the geographical areas in which the new maximum distance route breakup points are present are set as new target geographical names for the routes containing the newly set maximum distance route breakup points. If there is no route for which a unique geographical name has been set, the names of the next highest order units of administrative districts after the administrative district indicated by the current target geographical name are set as new target geographical names for the individual routes. At this time, if the target geographical names indicate the lowest-order unit of administrative districts, new maximum distance route breakup points are selected from route breakup points other than the current maximum distance route breakup points. Through this process, it is possible to set new target geographical names to be used to add new geographical names into the adopted geographical name tables for registration.

(5) If the characteristics having been extracted for the individual routes include identical characteristics shared by a plurality of routes, identification numbers are assigned in sequence to distinguish the routes from one another. Consequently, even when a single geographical name is extracted as characteristics of two or more routes, it is possible to identify the routes as distinct from one another.

It is to be noted that while an explanation is given in reference to the second embodiment on an example in which route breakup points are set at positions at which each recommended route is broken up into a predetermined number of equal segments, the number of route breakup points to be set may be adjusted by altering the number of equal segments into which each route is to be divided in correspondence to the distance from the start point to the destination. It is desirable to set a smaller number of route breakup points if the destination is not far from the start point and to set a greater number of route breakup points as the distance between the start point and the destination increases.

In addition, an explanation is given above in reference to the second embodiment on an example in which the names of the next highest order units of administrative districts are set as target geographical names if the current target geographical names all match and do not include a unique geographical name and new target geographical names are continuously set all the way down to the names of the lowest-order unit of administrative districts, such as the names of communities or neighborhoods. However, it is not strictly necessary to continuously set new target geographical names down to the lowest-order units of administrative districts, and target geographical names may be set down to, for instance, the names of cities and counties instead. In addition, the processing may be executed so as to set as target geographical names the names of lower-order units of administrative districts when the distance between the start point and the destination is smaller.

While an explanation is given above in reference to the second embodiment on an example in which the maximum distance route breakup points are determined based upon the values calculated for the sums Sn of the linear distances between corresponding route breakup points, the maximum distance route breakup points may instead be determined based upon sums of values obtained by squaring the linear distances so as to highlight the differences in the distances among the routes indicated by the positions of the route breakup points. In addition, when setting new maximum distance route breakup points in the second embodiment explained above, the target geographical names set based upon the new maximum distance route breakup points may be the same as the previous target geographical names if the new maximum distance route breakup points are located close to the previous maximum distance route breakup points. In order to preempt such an eventuality, the new maximum distance route breakup points may be selected from the route breakup points distanced from the previous maximum distance route breakup points by extents equal to or greater than a predetermined value.

It is to be noted that a limit may be set for the number of display characters used to indicate a route name in the first and second embodiments described above. Namely, the processing for a given subject route may end when the total number of characters indicating the road names registered in its adopted geographical name table (in the first embodiment) or indicating the geographical names registered in its adopted geographical name table (in the second embodiment) has reached the character number limit having been set, and the registration contents at the time of the processing end may be displayed as the characteristics of the route.

In addition, the recommended route characteristics displays achieved in the first embodiment and the second embodiment as described above may be brought up simultaneously. Alternatively, either display may be brought up through a user selection. As a further alternative, either display may be brought up under normal circumstances and the other display may be used as an alternative when it is judged that the normal display cannot indicate the geographical characteristics of the recommended routes adequately.

While an explanation is given above in reference to the embodiments on an example in which the map data are read out from a storage medium such as a DVD-ROM, the present invention is not limited to this example. For instance, the present invention may be adopted in a communication navigation system that downloads map data from an information distribution center through wireless communication via a portable telephone or the like. In such a case, the processing described above may be executed at the information distribution center and the results of the processing provided as a signal output from the information distribution center may be transmitted to the on-vehicle information terminal. Namely, such an information distribution center should be constituted with a device that searches for a plurality of routes connecting the current position to the destination, a device that extracts characteristics of the individual routes based upon geographical names and a device that outputs signals indicating the characteristics of the routes to an external recipient.

Figure 11:
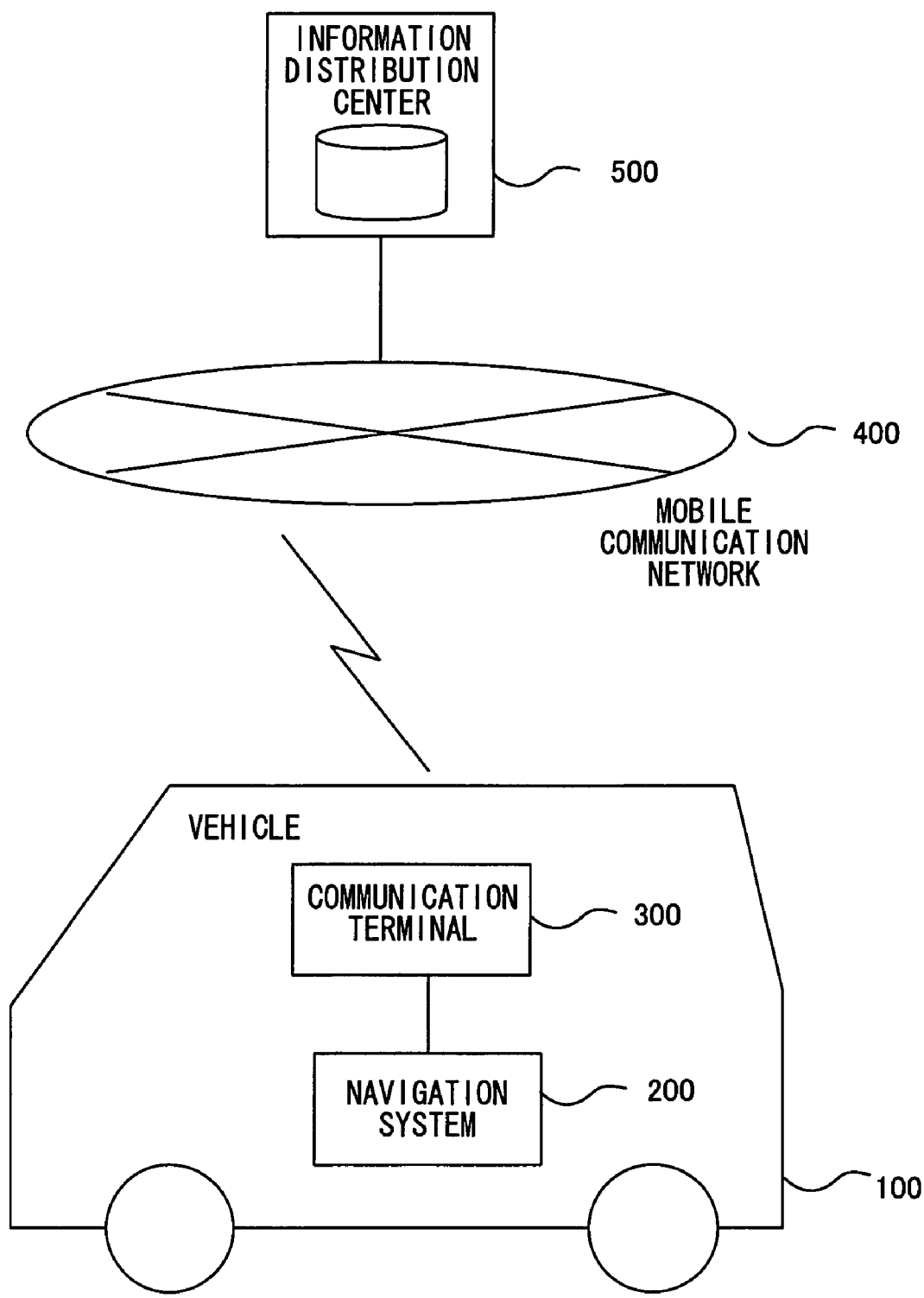
FIG. 11 shows how the present invention may be adopted in a communication navigation system.

FIG. 11 shows a configuration that may be adopted in such an application. A navigation system 200 installed in a vehicle 100 is connected to a communication terminal 300. The communication terminal 300 may be a portable telephone. The communication terminal 300 is wirelessly connected to a mobile communication network 400. An information distribution center 500 is connected to the mobile communication network 400. In other words, the navigation system 200 is connected with the information distribution center 500 via the communication terminal 300 and the mobile communication network 400. Upon establishing a connection with the information distribution center 500, the navigation system 200 transmits to the information distribution center 500 a map data delivery request. In response to the delivery request, the information distribution center 500 executes the processing, the details of which have been described earlier, and transmits map data to the navigation system 200. The navigation system 200 then receives the map data provided by the information distribution center 500 via the mobile communication network 300 and the communication terminal 200. The present invention can be effectively adopted in such a communication navigation system, as well.

Figure 12:
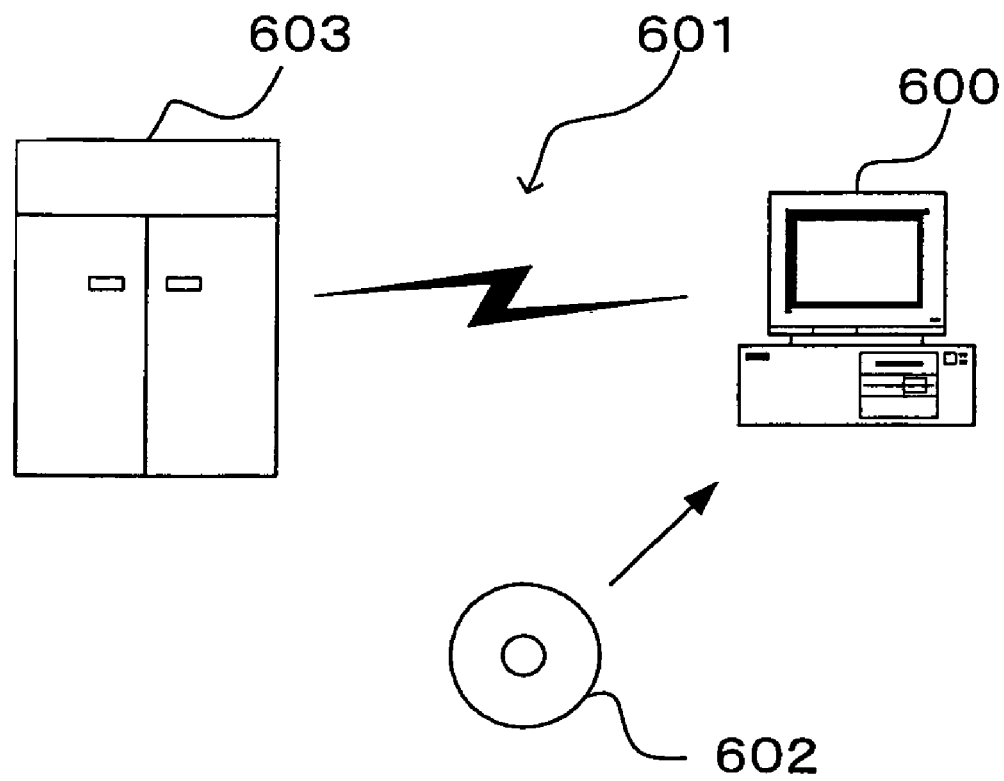
FIG. 12 shows how the present invention may be adopted in conjunction with a personal computer.

It is to be noted that when the present invention is adopted in conjunction with a personal computer or the like, a program that enables the control described above may be provided in a recording medium such as a CD-ROM or through an electrical communication network such as the Internet. FIG. 12 shows a configuration that may be adopted in such an application. A personal computer 600 receives the program via a CD-ROM 602. In addition, the personal computer 600 is capable of achieving a connection with a communication line 601 through which the program can be provided by a server 603. The communication line 601 may be a communication line for Internet communication, personal computer communication or the like, or it may be a dedicated communication line. The server 603 transmits the program to the personal computer 600 via the communication line 601. Namely, the program converted to a data signal on a carrier wave is then transmitted via the communication line 601. In short, the program can be distributed as a computer-readable computer program product adopting any of various modes including a recording medium and a carrier wave.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2003-325773 filed Sep. 18, 2003

The invention claimed is:

1. An information terminal, comprising:
a route search unit that searches for a plurality of routes connecting a current position to a destination;
a table preparing unit that prepares a block name-distance table for each of the routes, which is constituted with road names of roads included in the routes and distances over which individual blocks of the routes extend, each corresponding to specific road name, based upon route data containing link information of the routes;

an identification unit that identifies road names of blocks each of which extends over a longest distance in each of the routes based upon the block name-distance table;

a characteristics extraction unit that extracts the identified road names as characteristics of the routes; and a display control unit that displays the extracted characteristics of each of the routes at a display device.

2. An information terminal according to claim 1, wherein:

the characteristics extraction unit sets a longest distance block among the blocks of which the road names are identified as a target block;

the characteristics extraction unit sets a route containing the target block as a target route;

the characteristics extraction unit sets routes other than the target route as a comparison route group;

the characteristics extraction unit compares a first distance value obtained by multiplying the distance of the target block by a predetermined multiplicand with a distance (a second distance value) of a block (in the comparison block group) included in the comparison route group and bearing a name identical to the name of the target block;

the characteristics extraction unit extracts the road name of the target block among the identified road names for the target route if the first distance value is greater than the second distance value; and the characteristics extraction unit extracts the road name of the target block among the identified road names for the target route and a route (an identified route) containing a block in the comparison block group corresponding to the second distance value equal to or greater than the first distance value if the first distance value is not greater than the second distance value.

3. An information terminal according to claim 2, wherein:

if the first distance value is greater than the second distance value, the characteristics extraction unit sets a longest distance block in the comparison block group as a new target block and sets as a new target route a route containing the new target block; and if the first distance value is not greater than the second distance value, the characteristics extraction unit sets as a new target block a longest distance block among the blocks included in the target route excluding the target block.

4. An information terminal, comprising:

a route search unit that searches for a plurality of routes connecting a current position to a destination;

a route breakup point setting unit that sets points corresponding to individual positions breaking up each of the routes into a predetermined number of equal segments as route breakup points;

a calculation unit that calculates sums each representing a total of linear distances between route breakup points at corresponding positions in the routes among the route breakup points having been set;

a maximum distance route breakup point setting unit that sets route breakup points with a largest sum as maximum distance route breakup points;

a characteristics extraction unit that extracts geographical names of geographical points at which the maximum distance route breakup points are present as characteristics of the routes; and a display control unit that displays the extracted characteristics of each of the routes at a display device.

5. An information terminal according to claim 4, wherein:

the characteristics extraction unit sets names of highest-order units of administrative districts in the geographical names corresponding to the geographical points at which the maximum distance route breakup points are present as target geographical names of the individual routes; and the characteristics extraction unit extracts the target geographical names having been set for the individual routes.

6. An information terminal according to claim 5, wherein:

the characteristics extraction unit makes a decision as to whether or not one of the target geographical names having been set for the individual routes is different from the others;

if it is decided that there is a route with a target geographical name different from the others, the characteristics extraction unit sets as new maximum distance route breakup points a set of route breakup points with a greatest sum of linear distances between the route breakup points at corresponding positions set for the routes excluding the route with the different target geographical name and sets names of highest-order units of administrative districts in the geographical names corresponding to geographical points at which the new maximum distance route breakup points thus set are present as new target geographical names for the routes having the newly set maximum distance route breakup points; and if there is no route with a target geographical name different from the others, the characteristics extraction unit sets names of next highest-order units of administrative districts after administrative districts corresponding to the current target geographical names as new target geographical names for the individual routes.

7. An information terminal according to claim 6, wherein:

if there is no route with a target geographical name different from the others and the target geographical names ali indicate a lowest-order unit of administrative district, the characteristics extraction unit sets a new maximum distance route breakup points a set of route breakup points with a largest sum of linear distances between the route breakup points at corresponding positions in the individual routes among other route breakup points excluding the current maximum distance route breakup points.

8. An information terminal according to claim 1, wherein:

if identical characteristics are extracted in correspondence to a plurality of routes, the characteristics extraction unit sequentially assigns numbers to be used to identify the individual routes.

9. A route characteristics extraction apparatus, comprising:

a route search unit that searches for a plurality of routes connecting a current point to a destination;

a table preparing unit that prepares a block name-distance table for each of the routes, which is constituted with road names of roads included in the routes and distances over which individual blocks of the routes extend, each corresponding to specific road name, based upon route data containing link information of the routes;

an identification unit that identifies road names of blocks each of which extends over a longest distance in each of the routes based upon the block name-distance table;

a characteristics extraction unit that extracts the identified road names as characteristics of the routes; and an output unit that provides an external recipient with a signal output indicating the characteristics of the individual routes extracted by the characteristics extraction unit.

10. A route characteristics display method comprising:
searching for a plurality of routes connecting a current point to a destination;
preparing a block name-distance table for each of the routes, which is constituted with road names of roads included in the routes and distances over which individual blocks of the routes extend, each corresponding to snecific road name, based upon route data containing link information of the routes;
identifying road names of blocks each of which extends over a longest distance in each of the routes based upon the block name-distance table;
extracting the identified road names as characteristics of the routes; and
displaying the extracted characteristics of each route.

11. An information terminal according to claim 4, wherein:
if identical characteristics are extracted in correspondence to a plurality of routes, the characteristics extraction unit sequentialiy assigns numbers to be used to identify the individual route.

12. A route characteristics extraction apparatus, comprising:
a route search unit that searches for a plurality of routes connecting a current position to a destination;
a route breakup point setting unit that sets points corresponding to individual positions breaking up each of the routes into a predetermined number of equal segments as route breakup points;
a calculation unit that calculates sums each representing a total of linear distances between route breakup points at corresponding positions in the routes among the route breakup points having been set;
a maximum distance route breakup point setting unit that sets route breakup points with a largest sum as maximum distance route breakup points;
a characteristics extraction unit that extracts geographical names of geographical points at which the maximum distance route breakup points are present as characteristics of the routes; and
an output unit that provides an external recipient with a signal output indicating the characteristics of the individual routes extracted by the characteristics extraction unit.

13. A route characteristics display method comprising:
searching for a plurality of routes connecting a current position to a destination;
setting points corresponding to individual positions breaking up each of the routes into a predetermined number of equal segments as route breakup points;
calculating sums each representing a total of linear distances between route breakup points at corresponding positions in the routes among the route breakup points having been set;
setting route breakup points with a largest sum as maximum distance route breakup points;
extracting geographical names of geographical points at which the maximum distance route breakup points are present as characteristics of the routes; and
displaying the extracted characteristics of each route.

* * * * *